(12) United States Patent
Ozawa

(10) Patent No.: US 9,030,630 B2
(45) Date of Patent: May 12, 2015

(54) MICROLENS ARRAY SUBSTRATE, ELECTRO-OPTIC DEVICE, AND ELECTRONIC APPARATUS

(71) Applicant: Seiko Epson Corporation, Tokyo (JP)

(72) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 13/893,476

(22) Filed: May 14, 2013

(65) Prior Publication Data

US 2013/0308077 A1 Nov. 21, 2013

(30) Foreign Application Priority Data

May 18, 2012 (JP) ................. 2012-114155

(51) Int. Cl.
*G02F 1/1335* (2006.01)
*G02F 1/1333* (2006.01)
*G02B 27/10* (2006.01)
*G03B 21/60* (2014.01)
*G02B 27/22* (2006.01)
*G02B 3/00* (2006.01)
*H04N 9/31* (2006.01)

(52) U.S. Cl.
CPC ........ *G02F 1/133526* (2013.01); *G02B 3/0006* (2013.01); *G02B 3/005* (2013.01); *G02F 2001/133562* (2013.01); *H04N 9/3152* (2013.01)

(58) Field of Classification Search
CPC ............. G02F 1/133526; G02F 1/133621; G02F 1/133512; G02F 2001/133627; G02F 1/1333; G02F 1/133305; G02F 1/133351; G02B 3/0056; H04N 9/3197; H04N 9/3105; H04N 5/7441

USPC ................. 349/95, 5, 158; 359/619, 455, 463
See application file for complete search history.

(56) References Cited

U.S. PATENT DOCUMENTS

| | | | | |
|---|---|---|---|---|
| 5,844,644 A | * | 12/1998 | Oh et al. | 349/95 |
| 6,640,057 B1 | * | 10/2003 | Szajewski et al. | 396/322 |
| 6,781,762 B2 | | 8/2004 | Ozawa | |
| 7,372,631 B2 | * | 5/2008 | Ozawa | 359/619 |
| 2004/0263993 A1 | * | 12/2004 | Tsai et al. | 359/654 |

(Continued)

FOREIGN PATENT DOCUMENTS

| | | |
|---|---|---|
| JP | 2003-185803 A | 7/2003 |
| JP | 2004-070282 A | 3/2004 |

(Continued)

OTHER PUBLICATIONS

Kimishima et al., JP 2007-212494 A, JPO machine translation.*

*Primary Examiner* — Mike Qi

(74) *Attorney, Agent, or Firm* — ALG Intellectual Property, LLC

(57) ABSTRACT

A microlens includes a lens center portion having a lens-curved surface and a lens circumference portion having a linear side surface. In the case where length of the side surface is taken as $L_1$, length of an aperture is taken as $A_x$, an angle formed by a normal of the side surface and incident light on the microlens is taken as $\theta_1$, and an angle formed by the normal of the side surface and output light from the microlens is taken as $\theta_2$, a relational expression of Equation 1 is satisfied.

$$0 < L_1 \leq \frac{A_x \cos(\theta_1 - \theta_2)}{\cos\theta_2} \quad \text{Equation 1}$$

7 Claims, 9 Drawing Sheets

(56) References Cited

U.S. PATENT DOCUMENTS

| | | | |
|---|---|---|---|
| 2006/0239174 A1* | 10/2006 | Miyao et al. | 369/275.1 |
| 2007/0013830 A1* | 1/2007 | Hayakawa | 349/95 |
| 2012/0206916 A1* | 8/2012 | Ohta | 362/238 |

FOREIGN PATENT DOCUMENTS

| | | |
|---|---|---|
| JP | 2006-058320 A | 3/2006 |
| JP | 2006-071941 A | 3/2006 |
| JP | 2006-071947 A | 3/2006 |
| JP | 2006-078782 A | 3/2006 |
| JP | 2006-301589 A | 11/2006 |
| JP | 2007-171856 A | 7/2007 |
| JP | 2007-279088 A | 10/2007 |
| JP | 2009-272068 A | 11/2009 |
| JP | 2011-141466 A | 7/2011 |

* cited by examiner

MICROLENS ARRAY SUBSTRATE, ELECTRO-OPTIC DEVICE, AND ELECTRONIC APPARATUS

BACKGROUND

1. Technical Field

The present invention relates to microlens array substrates, electro-optic devices, and electronic apparatuses.

2. Related Art

A projector is an electronic apparatus that irradiates light to a transmissive electro-optic device, a reflective electro-optic device or the like, and projects the transmitted or reflected light having been modulated by the electro-optic devices onto a screen. The projector is configured so that light emitted from a light source is collected and made to enter the electro-optic device, and then the transmitted or reflected light that has been modulated in accordance with an electric signal is enlarged and projected onto a screen through a projection lens; the projector configured in this manner is advantageous in that it can magnify and display an image on a large screen. A liquid crystal device is widely known as an electro-optic device that is used in such electronic apparatus as described above; the liquid crystal device is configured to form an image by making use of dielectric anisotropy of liquid crystal and optical rotation of light in a liquid crystal layer.

Such liquid crystal device is required to be smaller in size and to increase the number of pixels in order to miniaturize an electronic apparatus and to enhance resolution of an image to be displayed. Meanwhile, in an electro-optic device, a region (aperture) where light is modulated is likely to become smaller (the aperture ratio decreases), as the electronic apparatus becomes smaller in size and the number of pixels is further increased. This has lowered efficiency in use of light supplied from a light source and made it difficult to display an image with high luminance. Therefore, in order to cover a decrease in the aperture ratio of a liquid crystal device, adopted is a method in which a microlens array is arranged on a light incidence side of the liquid crystal device to improve the efficiency in use of light. To be specific, minute microlenses are disposed corresponding to the apertures each of which being provided for each of pixels of the liquid crystal device.

As a microlens, an aspheric convex lens is well known as described in JP-A-2004-70282, for example. The liquid crystal device is configured by disposing a liquid crystal layer between a thin-film transistor (TFT) element substrate and an opposing substrate, and the microlenses are formed in the opposing substrate. More specifically, the aspheric convex microlenses are formed on a surface of the opposing substrate, a transparent plate member covers the microlenses, and the liquid crystal layer is disposed between the transparent plate member and the TFT element substrate.

However, in the electro-optic device described in JP-A-2004-70282, there is a problem in that the incident light on the microlens is not always efficiently introduced to the aperture for sure. That is, since the shape of the aspheric convex lens and the placement position of the microlens are not specified, the relationship between the shape of a beam of light outputted from the microlens and a light blocking portion that specifies the aperture is not optimized, which causes an issue that the efficiency in use of light is lowered.

SUMMARY

An advantage of some aspects of the invention is to solve at least a part of the above issue, and the invention can be realized as described in the following embodiments or application examples.

A microlens array substrate according to an application example of the invention includes a transparent substrate having a lens-shaped recess on one surface, a microlens that is filled with a lens material having a larger refractive index than the transparent substrate and that is embedded in the recess, and a light blocking portion that defines an aperture at an area at least corresponding to the center of the microlens when viewed from top. Further, in the microlens array substrate, the microlens includes: a lens center portion that is formed at the center of the microlens when viewed from top and has a lens-curved surface; and a lens circumference portion that is formed continuously with the lens-curved surface and in addition formed circularly surrounding the lens center portion when viewed from top, and that has a linear side surface in a cross-section that traverses the center of the lens. Furthermore, in the microlens array substrate, a relational expression of Equation 1 described below is satisfied, in which length of the above side surface is taken as $L_1$, length of the aperture is taken as $A_x$, an angle formed by the normal of the side surface and incident light on the microlens is taken as $\theta_1$, and an angle formed by the normal of the side surface and output light from the microlens is taken as $\theta_2$.

$$0 < L_1 \leq \frac{A_x \cos(\theta_1 - \theta_2)}{\cos\theta_2} \qquad \text{Equation 1}$$

With this configuration, it is possible to make the microlens be an aspheric lens having a linear side surface, and also to output parallel light perpendicularly incident on the microlens to the aperture. That is, incident light on the microlens can be efficiently guided to the aperture. In other words, it is possible to optimize the shape of a beam of light outputted from the microlens, and to enhance the efficiency in use of the light.

In the microlens array substrate according to the above application example, it is preferable that the light blocking portion include a first light blocking portion having a length of $B_{1x}$ and a second light blocking portion having a length of $B_{2x}$, and that a relational expression of Equation 2 described below be satisfied in the case where length from the microlens to the light blocking portion (lens position) is taken as $L_z$.

$$B_{1x}\tan\left\{\frac{\pi}{2} - (\theta_1 - \theta_2)\right\} \leq L_2 \leq (A_x + B_{1x})\tan\left\{\frac{\pi}{2} - (\theta_1 - \theta_2)\right\} \qquad \text{Equation 2}$$

With this configuration, it is possible to prevent the first light blocking portion from blocking the light that has passed through an edge of the microlens if the lens position $L_z$ is greater than or equal to a lower limit value (left-side value) in Equation 2, and to prevent the second light blocking portion from blocking the light that has passed through an boundary between the lens circumference portion and the lens center portion if the lens position $L_z$ is less than or equal to an upper limit value (right-side value) in Equation 2.

An electro-optic device according to an application example of the invention includes a transparent substrate having a lens-shaped recess on one surface, a microlens that is filled with a lens material having a larger refractive index than the transparent substrate and that is embedded in the recess, and a light blocking portion that defines an aperture at an area at least corresponding to the center of the microlens when viewed from top. Further, in the electro-optic device, the microlens includes: a lens center portion that is formed at the center of the microlens when viewed from top and has a lens-curved surface; and a lens circumference portion that is formed continuously with the lens-curved surface and in addition formed circularly surrounding the lens center portion when viewed from top, and that has a linear side surface in a cross-section that traverses the center of the lens. Furthermore, in the electro-optic device, a relational expression of Equation 3 described below is satisfied, in which length of the above side surface is taken as $L_1$, length of the aperture is taken as $A_x$, an angle formed by the normal of the side surface and incident light on the microlens is taken as $\theta_1$, and an angle formed by the normal of the side surface and output light from the microlens is taken as $\theta_2$.

$$0 < L_1 \leq \frac{A_x \cos(\theta_1 - \theta_2)}{\cos\theta_2} \qquad \text{Equation 3}$$

With this configuration, it is possible to make the microlens be an aspheric lens having a linear side surface, and also to output parallel light perpendicularly incident on the microlens to the aperture. That is, incident light on the microlens can be efficiently guided to the aperture. In other words, it is possible to optimize the shape of a beam of light outputted from the microlens, and to enhance the efficiency in use of the light.

In the electro-optic device according to the above application example, it is preferable that the light blocking portion include a first light blocking portion having a length of $B_{1x}$ and a second light blocking portion having a length of $B_{2x}$, and that a relational expression of Equation 4 described below be satisfied in the case where the length from the microlens to the light blocking portion (lens position) is taken as $L_z$.

$$B_{1x}\tan\left\{\frac{\pi}{2} - (\theta_1 - \theta_2)\right\} \leq L_z \leq (A_x + B_{1x})\tan\left\{\frac{\pi}{2} - (\theta_1 - \theta_2)\right\} \qquad \text{Equation 4}$$

With this configuration, it is possible to prevent the first light blocking portion from blocking the light that has passed through an edge of the microlens if the lens position $L_z$ is greater than or equal to a lower limit value (left-side value) in Equation 4, and to prevent the second light blocking portion from blocking the light that has passed through an boundary between the lens circumference portion and the lens center portion if the lens position $L_z$ is less than or equal to an upper limit value (right-side value) in Equation 4.

In the electro-optic device according to the above application example, it is preferable for the electro-optic device to further include a first substrate, a second substrate and a liquid crystal layer, for the liquid crystal layer to be disposed between the first and second substrates, for the light blocking portion to be formed in the first substrate, and for the microlens to be formed in the second substrate.

Since the liquid crystal layer is disposed between the first and second substrates, it is possible to make a distance between the first and second substrates larger than a few microns. Accordingly, with this configuration, the lens position $L_z$ can be made larger than a few microns, and parallel light perpendicularly incident on the microlens can be efficiently guided to the aperture.

An electronic apparatus according to an application example includes the microlens array substrate described in the aforementioned application example, in which the microlens is formed in a convex shape facing to the light incidence side and the light blocking portion is positioned on the light output side with respect to the microlens.

With this configuration, it is possible to realize a compact electronic apparatus having a higher efficiency in use of light and being capable of displaying a bright high-resolution image.

An electronic apparatus according to an application example includes the electro-optic device described in the aforementioned application example, in which the microlens is formed in a convex shape facing to the light incidence side and the light blocking portion is positioned on the light output side with respect to the microlens.

With this configuration, it is possible to realize a compact electronic apparatus having a higher efficiency in use of light and being capable of displaying a bright high-resolution image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
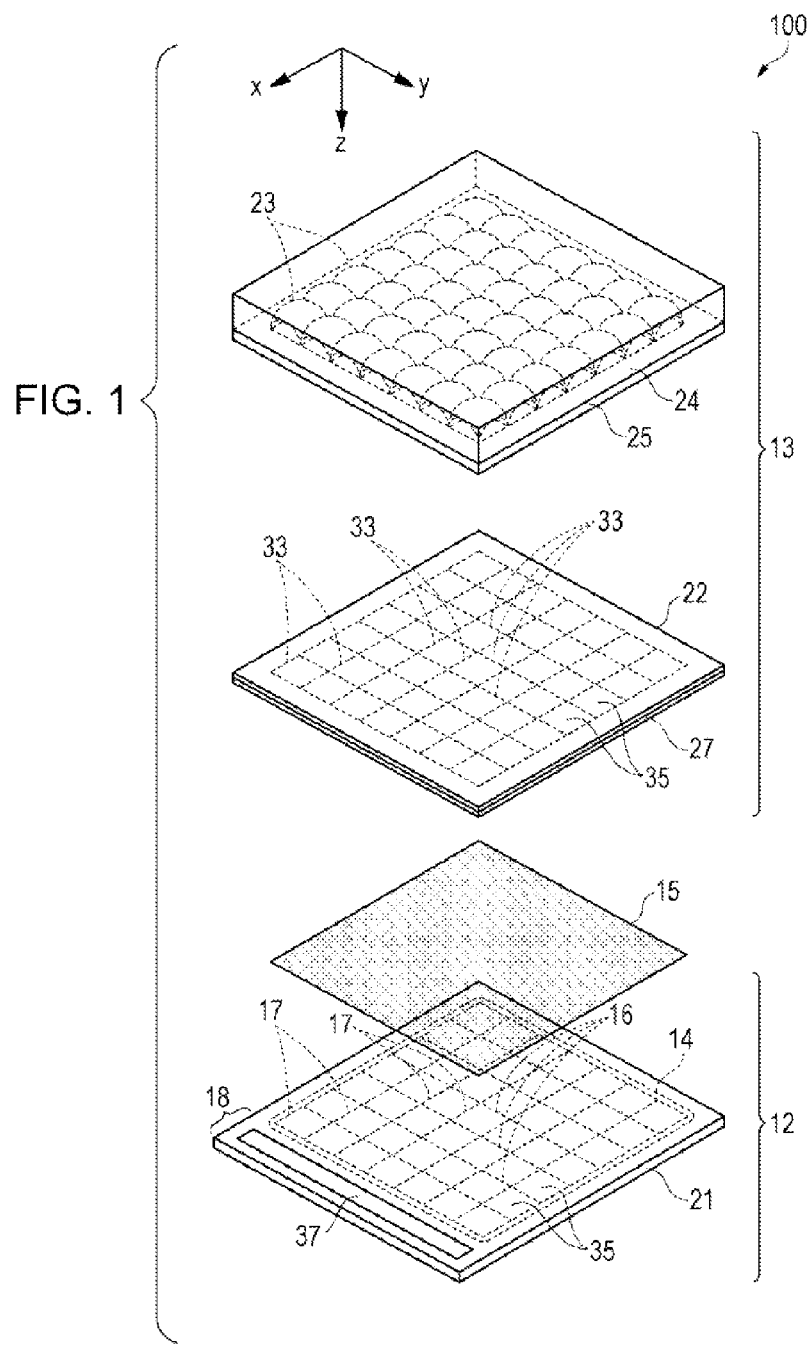
FIG. 1 is an exploded perspective view illustrating a structure of a liquid crystal device.

Hereinafter, embodiments of the invention will be described with reference to the drawings. It is to be noted that in the following drawings, scales of the layers, members, and the like are different from and made larger than the actual scales so that they can be visually recognizable in the drawings.

First Embodiment
Outline

First, an electro-optic device according to a first embodiment will be described with reference to FIG. 1.

FIG. 1 is an exploded schematic perspective view of a structure of a liquid crystal device as an electro-optic device, in which the structure of the liquid crystal device is illustrated in an exploded manner. Hereinafter, the structure of the liquid crystal device will be explained referring to FIG. 1. It is to be noted that in the following description of the embodiment, description of "on something" refers to a situation in which an element is disposed in contact with something, an element is disposed on something via another element, or a part of an element is disposed in contact with something and the other part thereof is disposed on something via another element. An up-down direction is defined as a z axis direction shown in FIG. 1.

As shown in FIG. 1, a liquid crystal device 100 includes a first substrate (element substrate 12), a second substrate (opposing substrate 13), and a liquid crystal layer 15, and the liquid crystal layer 15 is disposed between the first and second substrates. In this embodiment, a microlens 23 and a light blocking film 33 (see FIG. 5) are formed in the second substrate. Since the light blocking film 33 forms part of or all of the light blocking portion, the opposing substrate 13 is also a microlens array substrate. Further, the liquid crystal device 100 includes a sealing material 14 for bonding the element substrate 12 and the opposing substrate 13; within a space sandwiched between the element substrate 12 and the opposing substrate 13, a region inside of the sealing material 14 is filled with the liquid crystal layer 15.

The element substrate 12 includes: a first transparent substrate 21 formed of, for example, a translucent material such as quartz; and a plurality of wiring lines (scanning lines, signal lines, and the like) and thin-film circuit elements which are provided on the first transparent substrate 21. In this embodiment, an extension direction of the signal line 17 is taken as an x axis, an extension direction of the scanning line 16 orthogonal to the x axis is taken as a y axis, and a thickness direction of the substrate is taken as the z axis.

The scanning lines 16 are arranged in parallel to each other with an interval in the x axis direction. The signal lines 17 are arranged in parallel to each other with an interval in the y axis direction. In FIG. 1, a few scanning lines 16 and a few signal lines 17 are indicated respectively for facilitating the understanding of the structure; however, in actuality, a large number of scanning lines 16 and signal lines 17 are disposed in accordance with the number of pixels. In the first transparent substrate 21, a projecting portion 18 projecting outward from a second transparent substrate 24 is provided.

The sealing material 14 is an adhesive which is formed of, for example, light curing resin, thermosetting resin, or the like for bonding the element substrate 12 and the opposing substrate 13, and in which a spacer such as fiber glass, glass beads, or the like is disposed in a mixed manner so as to set the distance between the two substrates to a predetermined value.

The opposing substrate 13 includes the second transparent substrate 24 formed of, for example, a translucent material such as quartz, the microlens 23 which is made of a medium 25 and formed in the second transparent substrate 24, and an adjustment film 22. The adjustment film 22 is a film that appropriately sets a distance between the microlens 23 and a light blocking portion 75 (see FIG. 8) so that a beam of light collected by the microlens efficiently passes through an aperture 73 (see FIG. 8).

On a surface of the adjustment film 22 (surface on the side in the z axis positive direction in FIG. 1), the light blocking film 33 is provided, and on the light blocking film 33, there is provided a common electrode 27. The light blocking film 33 is provided in a lattice pattern being opposed to the scanning lines 16 and signal lines 17. The microlens array substrate is a substrate that includes the microlens 23 and the light blocking portion, therefore, the opposing substrate 13 including the microlens 23, the adjustment film 22, and the light blocking film 33 is also a microlens array substrate because the light blocking film 33 configures part of the light blocking portion.

A large number of microlenses 23 are disposed in a matrix pattern within the second transparent substrate 24 each corresponding to a region of a pixel 35 (pixel division 351: see FIG. 8) specified by the scanning lines 16 and the signal lines 17. In other words, one microlens 23 is disposed corresponding to one pixel 35 (pixel division 351). The microlens array substrate has a light collecting function in which incident light from the second transparent substrate 24 side is separated into a plurality of beams of light by a plurality of microlenses 23 and each of the plurality of beams of light is collected to the center portion of the corresponding pixel division 351, or the inside region of the corresponding light blocking portion (aperture 73: see FIG. 8).

As the medium 25, ultraviolet curing resin or the like such as acryl-based resin, epoxy-based resin, acrylic epoxy-based resin, or the like is appropriately used. The microlens 23 is formed by filling a concave-shaped recess formed in the second transparent substrate 24 with the medium 25 (see FIG. 5). The medium 25, when cured being sandwiched between the second transparent substrate 24 and the adjustment film 22, functions as an adhesion layer that bonds the second transparent substrate 24 to the adjustment film 22. Note that a portion from the first transparent substrate 21 to the second transparent substrate 24 excluding the microlenses 23 is called a "display panel".

Overall Configuration of Electro-Optic Device

Figure 2:
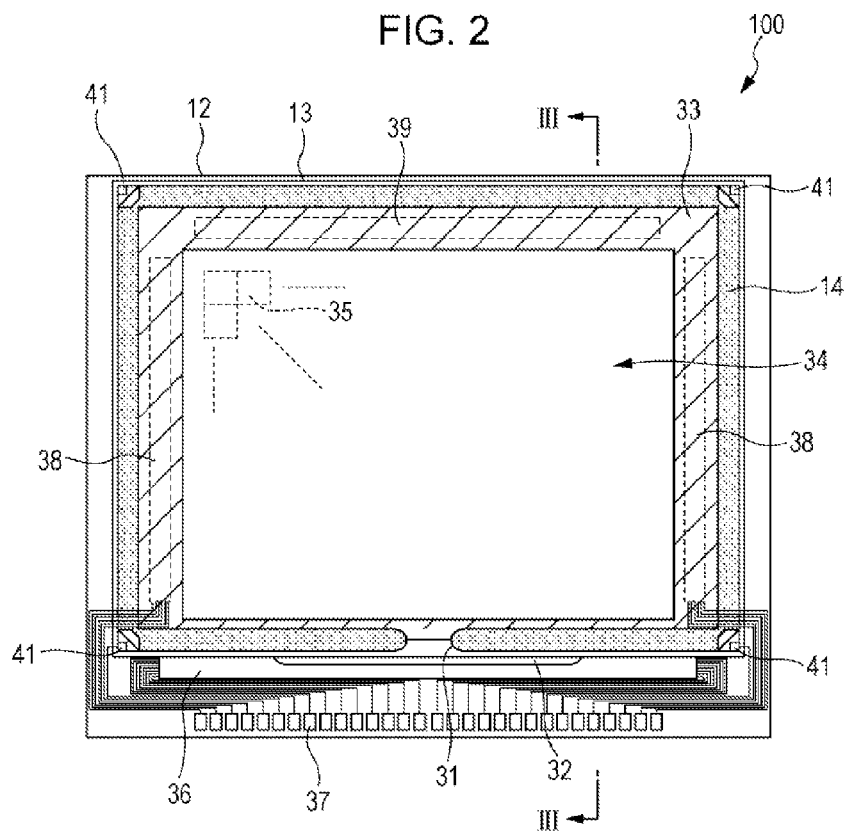
FIG. 2 is a schematic plan view illustrating a structure of the liquid crystal device.
Figure 3:
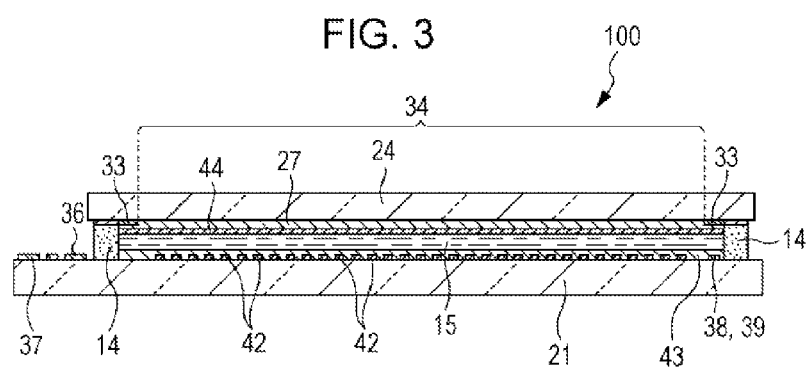
FIG. 3 is a schematic cross-sectional view of the liquid crystal device.

FIG. 2 is a schematic plan view illustrating a structure of the liquid crystal device. FIG. 3 is a schematic cross-sectional view of the liquid crystal device taken along a III-III line in FIG. 2. Hereinafter, the structure of the liquid crystal device will be described with reference to FIGS. 2 and 3. Note the microlenses 23 and the like described in FIG. 1 are not illustrated nor explained in the liquid crystal device shown in FIGS. 2 and 3.

As shown in FIGS. 2 and 3, the liquid crystal device 100 is a TFT active-matrix liquid crystal device in which a thin-film transistor (called a "TFT element") is uses as a pixel switching element. In the liquid crystal device 100, the element substrate 12 and the opposing substrate 13 configuring paired substrates are bonded with the sealing material 14 that is arranged approximately in a rectangular frame-like shape when viewed from top.

The liquid crystal device 100 has a configuration in which a region surrounded by the sealing material 14 is air-tightly sealed with the liquid crystal layer 15. A liquid crystal injection port 31 for injecting the liquid crystal therefrom is provided in the sealing material 14, and the liquid crystal injection port 31 is sealed with a sealing member 32.

As the liquid crystal layer 15, a liquid crystal material having a positive dielectric anisotropy is used, for example. In the liquid crystal device 100, the light blocking film 33 made of a light-blocking material is formed in a rectangular frame-like shape when viewed from top along the vicinity of the inner circumference of the sealing member 14 in the second transparent substrate 24, and a region inside of this light blocking film 33 is a display region 34.

The light blocking film 33 is formed of, for example, aluminum (Al), which is a light-blocking material; the light blocking film 33 is so provided as to define the outer circumference of the display region 34 at the opposing substrate 13 side, and is also provided being opposed to the scanning lines 16 and the signal lines 17 in the display region 34 as described above.

In the display region 34, the pixels 35 are arranged in a matrix pattern. The pixels 35 are the regions specified by the scanning lines 16 and the signal lines 17 intersecting with each other, and one pixel 35 is a region defined by two scanning lines 16 and two signal lines 17; that is from one scanning line 16 to an adjacent scanning line 16, and from one signal line 17 to an adjacent signal line 17. At the outside region of the sealing material 14, a signal line driving circuit 36 and an external connection terminal 37 are formed along one side of the first transparent substrate 21 (lower side of FIG. 2). Further, at the inside region of the sealing material 14, scanning line driving circuits 38 are provided respectively along the two sides adjacent to the above one side of the first transparent substrate 21. At the remaining one side of the first transparent substrate 21 (upper side of FIG. 2), an inspection circuit 39 is formed. The light blocking film 33 formed at the opposing substrate 13 side is formed at a position opposed to the scanning line driving circuits 38 and the inspection circuit 39 that are formed on the first transparent substrate 21 (to rephrase, at an overlapping position in a plan view), for example.

Meanwhile, in the corners of the second transparent substrate 24 (for example, four corner portions of the sealing material 14), inter-substrate conductive terminals 41 are disposed to electrically connect the element substrate 12 with the opposing substrate 13.

As shown in FIG. 3, a plurality of pixel electrodes 42 are formed at the liquid crystal layer 15 side of the first transparent substrate 21, and a first alignment layer 43 is formed covering these pixel electrodes 42. The pixel electrodes 42 are a conductive film formed of a transparent conductive material such as indium tin oxide (ITO) or the like.

Meanwhile, at the liquid crystal layer 15 side of the second transparent substrate 24, the light blocking film 33 is formed in a lattice pattern (see FIG. 1), and a planarly-solid common electrode 27 is formed on the light blocking film 33. Moreover, a second alignment layer 44 is formed on the common electrode 27. The common electrode 27 is a conductive film formed of a transparent conductive material such as ITO or the like.

The liquid crystal device 100 is a transmissive type device, in which polarizing plates (not shown) and the like are disposed on the light incidence side and the light output side of the element substrate 12 and of the opposing substrate 13, respectively. Note that the liquid crystal device 100 is not limited to the above configuration, and may have a reflective type configuration, a semi-transmissive type configuration, or the like.

Circuit Configuration

Figure 4:
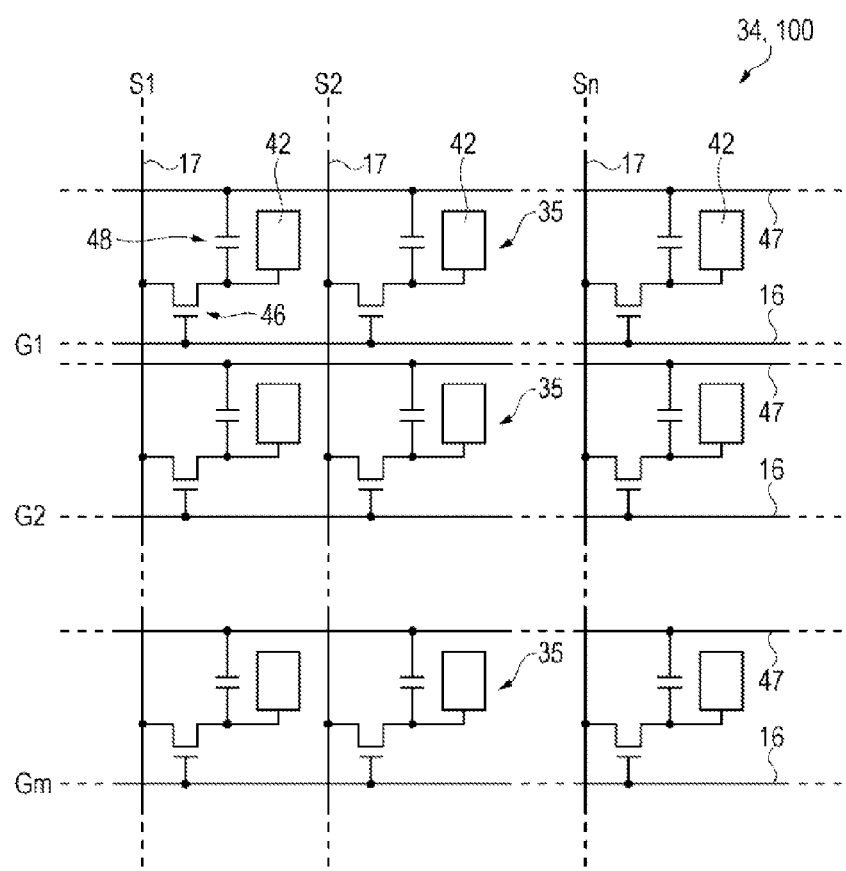
FIG. 4 is an equivalent circuit diagram illustrating an electric configuration of the liquid crystal device.

FIG. 4 is an equivalent circuit diagram illustrating an electric configuration of the liquid crystal device. Hereinafter, the electric configuration of the liquid crystal device will be explained referring to FIG. 4.

As shown in FIG. 4, the liquid crystal device 100 includes a plurality of pixels 35 configuring the display region 34. The pixel electrode 42 is disposed in each of the pixels 35. A TFT element 46 is formed in the pixel 35.

The TFT element 46 is a switching element that controls electrification of the pixel electrode 42. The signal line 17 is electrically connected to the source side of the TFT element 46. To the respective signal lines 17, for example, image signals S1, S2, . . . , Sn are supplied from the signal line driving circuit 36 (see FIG. 2).

The scanning line 16 is electrically connected to the gate side of the TFT element 46. To the respective scanning lines 16, for example, scanning signals G1, G2, . . . , Gm are supplied in pulse-like form at a predetermined timing from the scanning line driving circuit 38 (see FIG. 2). To the drain side of the TFT element 46, the pixel electrode 42 is electrically connected.

The TFT elements 46 serving as the switching elements are set to the on-state for a constant period of time due to the scanning signals G1, G2, . . . , Gm supplied through the scanning lines 16, whereby the image signals S1, S2, . . . , Sn supplied through the signal lines 17 are written into the pixels 35 via the pixel electrodes 42 at the predetermined timing.

The image signals S1, S2, . . . , Sn at a predetermine potential that have been written into the pixels 35 are each retained for a constant period of time by liquid crystal capacitance formed between the pixel electrode 42 and the common electrode 27 (see FIG. 3). In order to suppress decrease in potential of each of the retained image signals S1, S2, . . . , Sn due to a leak current, a retention capacitor 48 is formed with the pixel electrode 42 and a capacitance line 47 (called a "capacitance electrode 63" in some case).

In the case where a voltage signal is applied to the liquid crystal layer 15, the alignment state of the liquid crystal molecules is changed in accordance with a level of the applied voltage. This causes incident light on the liquid crystal layer 15 to be modulated so as to generate image light.

Detailed Structure of Electro-Optic Device

Figure 5:
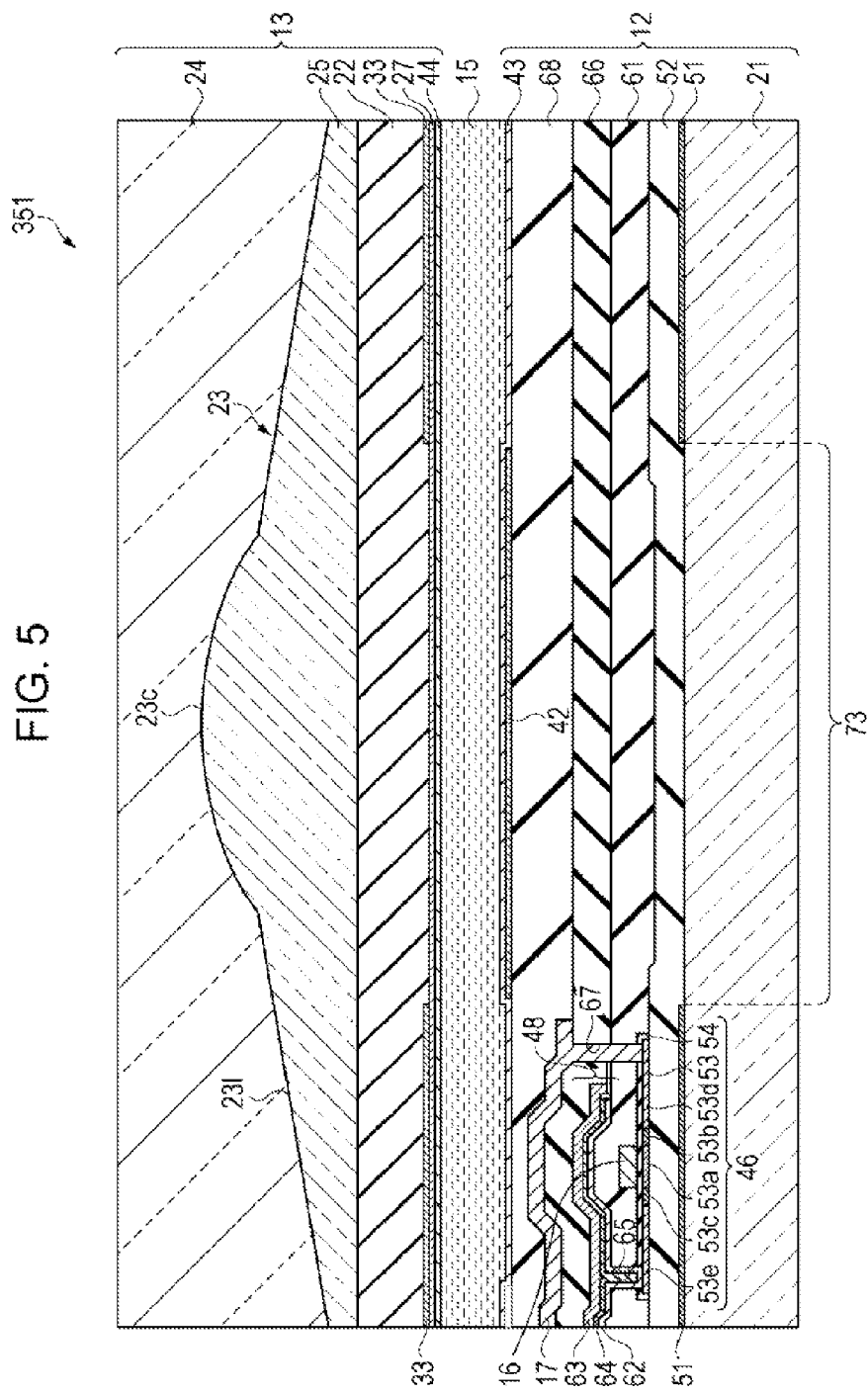
FIG. 5 is a schematic cross-sectional view illustrating a structure of the liquid crystal device.

FIG. 5 is a schematic cross-sectional view illustrating a structure of the liquid crystal device, in which a cross-section of one pixel division is depicted. The pixel division 351 (see FIG. 8) is a region surrounded by the center line of one scanning line 16 (a line that divides the one scanning line 16 into two parts in the width direction thereof) and the center line of an adjacent scanning line 16, and the center line of one signal line 17 (a line that divides the one signal line 17 into two parts in the width direction thereof) and the center line of an adjacent signal line 17. Hereinafter, the structure of the liquid crystal device will be explained referring to FIG. 5. Note that a cross-section of the positional relationship between the constituent elements is depicted in FIG. 5, and FIG. 5 is drawn with a scale in which those constituent elements can be explicitly illustrated. Further, in FIG. 5, for the sake of description, a cross-section for explaining the structure of the TFT is illustrated regarding the element substrate 12, and a cross-section that traverses the center of the microlens is illustrated regarding the microlens 23.

As shown in FIG. 5, the liquid crystal device 100 includes the first transparent substrate 21 and the second transparent substrate 24 that is disposed being opposed to the first transparent substrate 21. The first transparent 21 and second transparent substrate 24 are formed of, for example, a quartz substrate, a glass substrate, or the like.

On the first transparent substrate 21, a lower-side light blocking film 51 made of titanium (Ti), chromium (Cr), or the like is formed. The lower-side light blocking film 51 is planarly patterned in lattice form, and defines the aperture 73 of each pixel together with the capacitance electrode 63, the scanning line 16 and the signal line 17, or with the light blocking film 33 formed in the adjustment film 22 and the like. A base insulating film 52 made of a silicon oxide film or the like is formed on the first transparent substrate 21 and the lower-side light blocking film 51.

The TFT element 46, the scanning line 16, and the like are formed on the base insulating film 52. The TFT element 46 has a lightly doped drain (LDD) structure, for example, and includes a semiconductor layer 53 made of poly-silicon or the like, a gate insulating film 54 formed on the semiconductor layer 53, and the scanning line 16 that is made of a poly-silicon film or the like and formed on the gate insulating film 54. As described above, the scanning line 16 functions as a gate electrode.

The semiconductor layer 53 includes a channel formation region 53a, a low-density source region 53b, a low-density drain region 53c, a high-density source region 53d, and a high-density drain region 53e. In the channel formation region 53a, a channel can be formed due to an electric field from the gate electrode (scanning line 16). A first interlayer insulating film 61 made of a silicon oxide film or the like is formed on the base insulating film 52.

The retention capacitor 48 and the like are provided on the first interlayer insulating film 61. The retention capacitor 48 is structured such that a relay layer 62 serving as a pixel potential-side capacitance electrode that is connected to the high-density drain region 53e of the TFT element 46 and the pixel electrode 42, and the capacitance electrode 63 serving as a fixed potential-side capacitance electrode are oppositely disposed via a dielectric film 64.

The capacitance electrode 63 and the signal line 17 can function as light blocking layers because they include aluminum which has relatively excellent light reflection performance and also include poly-silicon which has relatively excellent light absorption performance. That is, it is possible to block the light entering from the opposing substrate 13 side at the upper side of the TFT element 46 so as to shield the semiconductor layer 53 against the light.

A contact hole 65 is opened in the first interlayer insulating film 61 so as to electrically connect the high-density drain region 53e of the TFT element 46 and the relay layer 62 configuring the retention capacitor 48. A second interlayer insulating film 66 made of a silicon oxide film or the like is formed on the first interlayer insulating film 61.

The signal line 17 is formed on the second interlayer insulating film 66. A contact hole 67 is opened in the first interlayer insulating film 61 and second interlayer insulating film 66 so as to electrically connect the high-density source region 53d of the TFT element 46 and the signal line 17. A third interlayer insulating film 68 made of a silicon oxide film or the like is formed on the second interlayer insulating film 66. In the second interlayer insulating film 66 and third interlayer insulating film 68, a contact hole (not shown) is opened so as to electrically connect the pixel electrode 42 and the relay layer 62.

In other words, the high-density drain region 53e and the pixel electrode 42 are electrically connected via the contact hole 65, the relay layer 62, and the not-shown contact hole. The pixel electrode 42 and the first alignment layer 43 are formed on the third interlayer insulating film 68.

The pixel electrode 42 is planarly formed in a matrix pattern, and is made of, for example, a transparent conductive film such as an ITO film or the like. Further, the first alignment layer 43 having experienced alignment processing in a predetermine direction is formed on the pixel electrode 42. The first alignment layer 43 is made of, for example, a transparent organic film such as a polyimide film or the like.

On the first alignment layer 43, there is provided the liquid crystal layer 15 in which a space surrounded by the sealing material 14 (see FIG. 2) is filled with electro-optic matter such as liquid crystal. On the liquid crystal layer 15 side of the second transparent substrate 24, the second alignment layer 44 having experienced the alignment processing in a predetermined direction is formed covering the common electrode 27 made of a transparent ITO film or the like. The second alignment layer 44 is made of a transparent organic film such as a polyimide film or the like, for example. The liquid crystal layer 15, when an electric field from the pixel electrode 42 is not being applied thereto, is made to be in a predetermined alignment state by the first alignment layer 43 and the second alignment layer 44.

Figure 6:
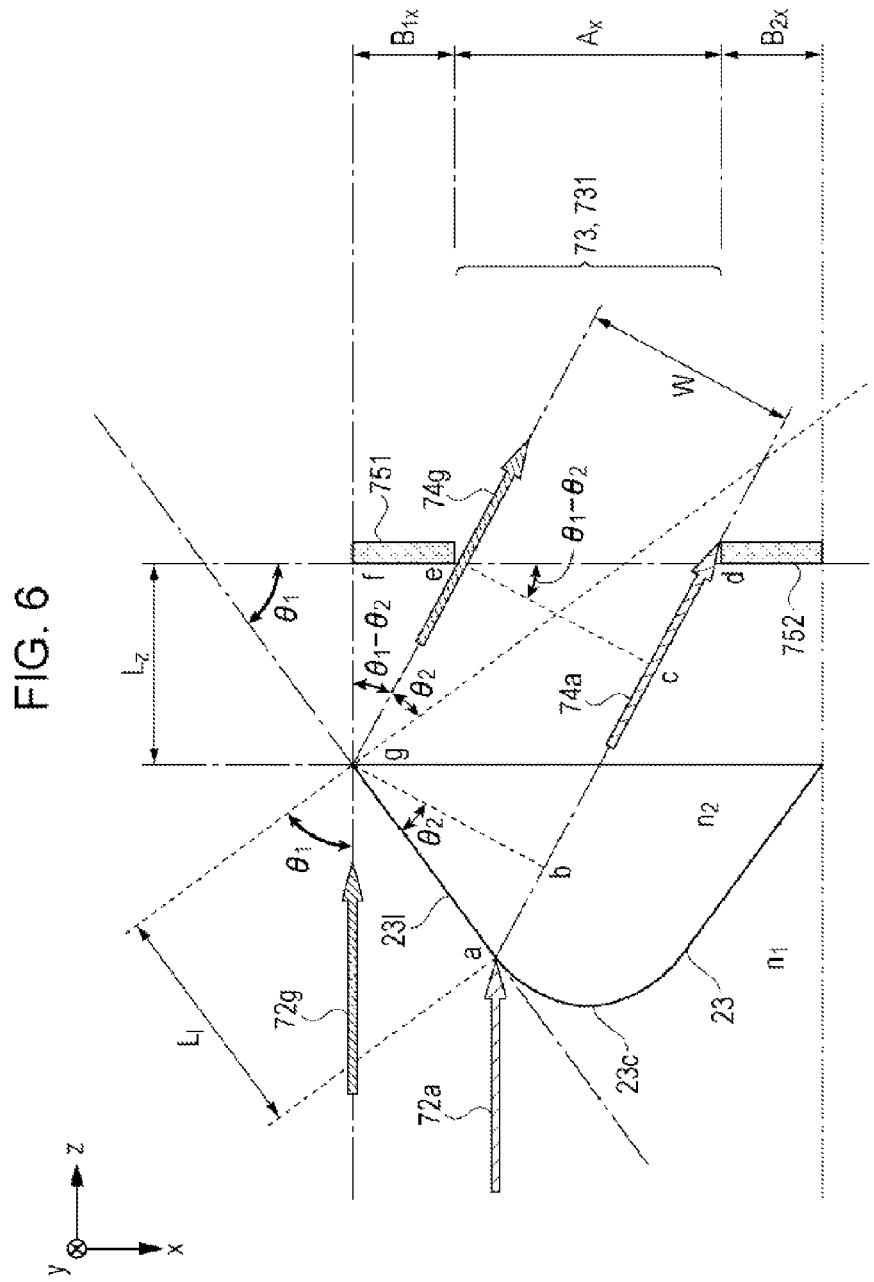
FIG. 6 is a schematic diagram for explaining light collecting action of a microlens.

In the second transparent substrate 24, the microlens 23 is disposed facing the liquid crystal layer 15 with the adjustment film 22 therebetween. In other words, a lens-shaped recess is formed at one surface side (surface on the liquid crystal layer 15 side) of the second transparent substrate 24, and the recess is filled with the medium 25 as a lens material. The microlens 23 includes a lens center portion 23c having a convex lens-curved surface and a lens circumference portion 231 having a linear side surface. At a boundary between the lens circumference portion 231 and the lens center portion 23c, the linear side surface and the lens-curved surface are continuously connected. The lens circumference portion 231 and the lens center portion 23c may be connected with each other so that a tangent of the lens circumference portion 231 and a tangent of the lens center portion 23c differ from each other at the boundary (in a mathematical expression, the boundary between the lens circumference portion 231 and the lens center portion 23c may be a non-differentiable point), as shown in FIG. 5. Alternatively, the lens circumference portion 231 and the lens center portion 23c, as shown in FIG. 6, may be connected with each other so that a tangent of the lens circumference portion 231 and a tangent of the lens center portion 23c coincide with each other at the boundary (in a mathematical expression, the boundary between the lens circumference portion 231 and the lens center portion 23c may be a differentiable point). The lens circumference portion 231 is circularly formed so as to surround the lens center portion 23c when viewed from top.

The microlenses 23 are so formed as to correspond one by one to the pixel divisions 351 arranged in a matrix pattern. Accordingly, the plurality of microlenses 23 are formed in a matrix pattern at the same pitch as that of the pixels 35 when viewed from top, thereby configuring what is called a microlens array. The shape of the microlens 23 when viewed from top is a quadrilateral, which is a type of polygon, with its corners being roundish, for example. To be more specific, the shape of the microlens 23 is such that the opening edge portion of the lens (a lower-side edge of the lens circumference portion 231) is a quadrilateral approximately matching the pixel pitch, and the end portion thereof (lens center portion 23c) is sphere-shaped or oval sphere-shaped, for example.

The interior of the microlens 23 is filled with the medium 25 which has a different refractive index from that of the second transparent substrate 24 (preferably larger than that of the second transparent substrate 24). In this embodiment, the medium 25 is a high refractive-index transparent resin. An inorganic highly-refractive material such as a silicon nitride oxide film (SiNO) may be used as other material. By filling the concave recess formed in the second transparent substrate 24 with the high refractive-index transparent resin or the inorganic highly-refractive material and subsequently flattening the filled recess, the microlens 23 is formed; thereafter, the adjustment film 22 is formed with a silicon oxide film (SiO$_2$) or the like. Thickness of the adjustment film 22 is determined so as to satisfy Equation 10, which will be explained later; in this embodiment, the thickness is 11 μm. On the surface of the adjustment film 22, the light blocking film 33, the common electrode 27, and the second alignment layer 44 are formed so that the opposing substrate 13 faces the liquid crystal layer 15.

As described above, the microlenses 23 are provided for each of the pixels and the adjustment film 22 defines the shape of a beam of light, which makes it possible to collect the light entering from the opposing substrate 13 side into the aperture 73 and consequently to display a bright image.

All of the lower-side light blocking film 51, the capacitance electrode 63, and various kinds of metal wiring (scanning line 16, signal line 17, relay layer 62) that are formed in the element substrate 12, block the light, therefore these constituent elements configure part of the light blocking portion 75. Hereinafter, a group of the capacitance electrode 63, the various kinds of metal wiring, and the like is referred to as an upper-side light blocking film 71 in some case. Accordingly, the liquid crystal device 100 includes the light blocking portion formed in the first substrate (the lower-side light blocking film 51 and the upper-side light blocking film 71) and the microlenses 23 formed in the second substrate. Like in this embodiment, in the case where the light blocking portions are provided to both the first and second substrates, the aperture 73 (see FIG. 8) is a region that is not overlapped in a plan view by any of the lower-side light blocking film 51 and upper-side light blocking film 71 formed in the first substrate and the light blocking film 33 formed in the second substrate. Details of the light blocking portion 75 will be explained later.

Light Collecting Action

FIG. 6 is a schematic diagram for explaining light collecting action of the microlens. Hereinafter, the light collecting action of the microlens 23 will be explained with reference to FIG. 6. Note that FIG. 6 is a cross-sectional diagram that traverses the center of the microlens 23 when viewed from top, and this cross-section is parallel to an x-z plane (y=constant). Further, since FIG. 6 uses the coordinate system indicated in FIG. 1, the microlens array substrate is parallel to an x-y plane (z=constant), and the normal of the microlens array substrate is parallel to the z axis. Accordingly, parallel beams of light perpendicularly incident on the microlens 23 (incident light 72a, incident light 72g, and the like) are parallel to the z axis.

The schematic diagram shown in FIG. 6 indicates a relationship between the microlens 23 provided in the second transparent substrate 24, the aperture 73 (more precisely, a substantial aperture 731, see FIG. 8), the light blocking portion 75 (a first light blocking portion 751 and a second light blocking portion 752), and the light. In FIG. 6, the incident light 72 (72a, 72b, and the like) is incident on the microlens 23 from the left side, and passes through the aperture 73 as output light 74 (output light 74a, output light 74b, and the like) from the right side. A gap between the first light blocking portion 751 and the second light blocking portion 752 is the aperture 73 of the pixel. Details of the aperture 73 and the light blocking portion 75 will be explained later. The microlens 23 is used so as to collect the incident light 72, to guide it efficiently to the aperture 73 of the pixel, and to display a bright image.

First, the edge of the microlens 23 is taken as a g-point, and the boundary between the lens circumference portion 231 and the lens center portion 23c is taken as an a-point. Light that is incident on the g-point is the incident light 72g, and this incident light 72g becomes the output light 74g when it exits from the microlens 23. Likewise, light that is incident on the a-point is the incident light 72a, and this incident light 72a becomes the output light 74a when it exits from the microlens 23. Length of the side surface of the lens circumference portion 231 is taken as $L_1$, an angle formed by the normal of the side surface and the incident light 72g on the microlens 23 is taken as $\theta_1$, and an angle formed by the normal of the side surface and the output light 74g from the microlens 23 is taken as $\theta_2$. Length of the aperture 73 is taken as $A_x$, and the light blocking portion which is a region other than the aperture 73 includes the first light blocking portion 751 having a length of $B_{1x}$ and the second light blocking portion 752 having a length of $B_{2x}$. Length from the microlens 23 to the first light blocking portion 751 and the second light blocking portion 752 (lens position) is taken as $L_z$. The width with respect to a traveling direction of the light that is perpendicularly incident on the microlens 23 and passes through the lens circumference portion 231 (interval between the output light 74g and the output light 74a) is W.

Equation 5 holds because an angle of ced=$\theta_1-\theta_2$ in a right triangle of ecd.

$$W = A_x \cos(\theta_1 - \theta_2) \quad \text{Equation 5}$$

Meanwhile, in a right triangle of abg, Equation 6 holds.

$$\frac{W}{L_1} = \cos\theta_2 \quad \text{Equation 6}$$

Equation 7 can be obtained from Equations 5 and 6.

$$L_1 = \frac{A_x \cos(\theta_1 - \theta_2)}{\cos\theta_2} \quad \text{Equation 7}$$

The length $L_1$ of the linear lens circumference portion 231 is greater than zero. Meanwhile, if the length $L_1$ is less than or equal to the right side of Equation 7, the light having the width W from the output light 74a to the output light 74g will not be blocked by any of the first light blocking portion 751 and the second light blocking portion 752. That is, if Equation 8 is satisfied, most of the parallel beams of light perpendicularly incident on the microlens 23 are guided to the aperture 73.

$$0 < L_1 \leq \frac{A_x \cos(\theta_1 - \theta_2)}{\cos\theta_2} \quad \text{Equation 8}$$

Next, since an angle of gef=$\pi/2-(\theta_1-\theta_2)$ in a triangle of gfe, Equation 9 holds.

$$L_z = B_{1x}\tan\left\{\frac{\pi}{2} - (\theta_1 - \theta_2)\right\} \quad \text{Equation 9}$$

Accordingly, if the lens position $L_z$ is greater than or equal to the right side of Equation 9, it is possible to prevent the first light blocking portion 751 from blocking the light that has passed through the edge (g-point) of the microlens 23. Since the microlens 23 includes the lens circumference portion 231, the length $L_1$ of the side surface is greater than zero. Meanwhile, in the case where the length of the side surface is nearly in the limit of zero (the limit that $L_1$=0), the position of the a-point and the position of the g-point are almost coincident with each other, light that curves at the a-point (g-point) passes a d-point. Therefore, if the lens position $L_z$ is less than or equal to the value of the right side of Equation 9 obtained by using $A_x+B_{1x}$ (length of the side df) in place of $B_{1x}$ (length of the side ef), it is possible to prevent the second light blocking portion 752 from blocking the light that has passed through the boundary between the lens circumference portion 231 and the lens center portion 23c (a-point). That is, Equation 10 is satisfied in the above configuration.

$$B_{1x}\tan\left\{\frac{\pi}{2} - (\theta_1 - \theta_2)\right\} \leq L_z \leq (A_x + B_{1x})\tan\left\{\frac{\pi}{2} - (\theta_1 - \theta_2)\right\} \quad \text{Equation 10}$$

Through this, the first light blocking portion 751 does not block the light that has passed through the g-point if the lens position $L_x$ is greater than or equal to a lower limit (left-side value) of Equation 10, and the second light blocking portion 752 does not block the light that has passed through the a-point if the lens position $L_z$ is less than or equal to an upper limit (right-side value) of Equation 10. As a result, it is possible to enhance the efficiency in use of light and to display a bright image with high resolution. It is to be noted that, as shown in FIG. 5, since the light blocking portion includes the light blocking film 33, the upper-side light blocking film 71, and the lower-side light blocking film 51, it is most appropriate to determine the lens position $L_z$ according to each of the light blocking films. However, it may be acceptable that the lens position $L_z$ is determined to be a nearest distance from the microlens 23 to the light blocking portion. In this case, the lens position $L_z$ is approximately equal to the thickness of the adjustment film 22.

In this embodiment, Equations 8 and 10 are satisfied in the following configuration: that is, the length $A_x$ of the aperture 73=7.0 µm, the length $B_{1x}$ of the first light blocking portion 751=1.5 µm, the length $B_{2x}$ of the second light blocking portion 752=1.5 µm, a refractive index $n_1$ of the second transparent substrate 24=1.46, a refractive index $n_2$ of the medium 25=1.60, the angle $\theta_1$ formed by the normal of the side surface and the incident light 72g on the microlens 23=60°, the angle $\theta_2$ formed by the normal of the side surface and the output light 74g from the microlens 23=52°, the length $L_1$ of the side surface of the lens circumference portion 231=11 µm, and the lens position $L_z$=11 µm. With this, such an electro-optic device is realized that has a higher efficiency in use of light and that displays a bright image with high resolution.

Manufacturing Method of Electro-Optic Device

Figure 7:
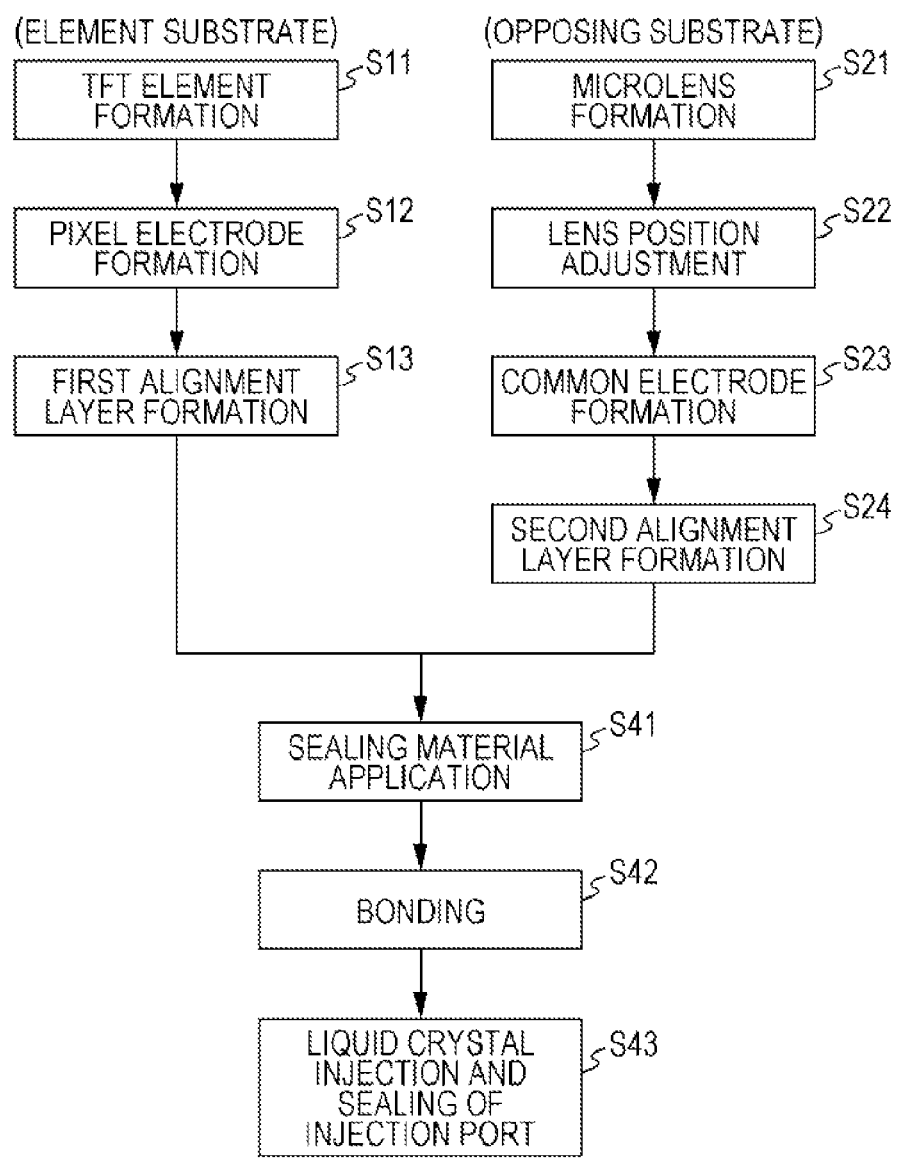
FIG. 7 is a flowchart illustrating a manufacturing method of the liquid crystal device.

FIG. 7 is a flowchart illustrating a manufacturing method of the liquid crystal device in the order of processing steps to be executed. Hereinafter, the manufacturing method of the liquid crystal device 100 will be described with reference to FIG. 7.

First, a manufacturing method of the element substrate 12 side will be described. In step S11, the TFT elements 46 and the like (see FIG. 5) are formed on the first transparent substrate 21. More specifically, the TFT elements 46 are formed on the first transparent substrate 21 using a known deposition technique, photolithography technique, and etching technique. Thereafter, other portions of the substrate up to the third interlayer insulating film 68 are formed using the same method.

In step S12, the pixel electrodes 42 are formed. To be more specific, the pixel electrodes 42 are formed on the third interlayer insulating film 68 using a known deposition technique, photolithography technique, and etching technique.

In step S13, the first alignment layer 43 is formed on the pixel electrodes 42. As a method for manufacturing the first alignment layer 43, the following methods can be employed, for example: that is, a rubbing method in which an organic film such as polyimide is formed using a discharge method, a transfer method or the like, thereafter rubbing processing is performed in a predetermined direction on a surface of the formed organic film; and an oblique deposition method in which an inorganic material such as silicon oxide is obliquely deposited. In the manner described above, the formation of the element substrate 12 side is completed.

Next, a manufacturing method of the opposing substrate 13 side will be described. First, in step S21, the microlenses 23 are formed on the second transparent substrate 24. Specifically, recesses are formed on the second transparent substrate 24 using a known deposition technique, photolithography technique, and etching technique. Subsequently, the inside of each of the recesses is filled with the medium 25 (lens material) formed of a high refractive-index transparent organic material which is a light curing or thermosetting material, for example, thereafter, the medium 25 is cured and the formation of the microlenses 23 is completed. At this time, an etching condition and the like are determined so that the length $L_1$ of the side surface of the lens circumference portion 231 and the angle $\theta_1$ formed by the normal of the side surface and the normal of the microlens array substrate satisfy Equation 8.

The shape of the microlens 23 when viewed from top (planar shape) is approximately the same as the shape of the pixel division 351 when viewed from top, and in addition, the position of the center of gravity of the microlens 23 when viewed from top (planar position of the center of gravity) is approximately the same as that of the substantial aperture 731 (position of the center of gravity in a plan view when the substantial aperture 731 is considered to be a flat plate). In this embodiment, the planar shape of the pixel division 351 and the planar shape of the microlens 23 are both a square, and the planar position of the center of gravity of the microlens 23 approximately coincides with the planar position of the center of gravity of the substantial aperture 731 to be positioned at the center of the pixel division 351. Note that in the above description, the expressions "to be approximately the same" and "to approximately coincide with" refer to conditions that are compliant with the designing or the concept of designing. With this, the incident light 72 on the microlens 23 can be collected within the aperture 73 of the pixel so that the incident light 72 can be efficiently used. This makes it possible to display a bright image. Subsequently, the manufacturing method of the opposing substrate 13 will be described in order referring to the flowchart shown in FIG. 7.

In step S22, the lens position $L_z$ is adjusted so that Equation 10 is satisfied. To be more specific, a silicon oxide film ($SiO_2$) serving as the adjustment film 22 is formed on the entire surface of the second transparent substrate 24 (medium 25) with a chemical vapor deposition method (CVD method) or the like. Thickness of the adjustment film 22 is determined so that the lens position $L_z$ satisfies Equation 10.

In step S23, the light blocking film 33 and the common electrode 27 are formed on the adjustment film 22 using a known deposition technique, photolithography technique, and etching technique.

In step S24, the second alignment layer 44 is formed on the common electrode 27. As a manufacturing method of the second alignment layer 44, like in the case of the first alignment layer 43, the rubbing method, the oblique deposition method, and the like can be used. Through this, the formation of the opposing substrate 13 side is completed. Hereinafter, a method of bonding the element substrate 12 and the opposing substrate 13 will be described.

In step S41, the sealing material 14 is applied on the element substrate 12. To be more specific, the sealing material 14 is applied to the circumferential border of the display region 34 (surrounding the display region 34) in the element substrate 12 by changing the relative positional relationship between the element substrate 12 and a dispenser (a discharge unit can be used instead).

In step S42 (bonding process), the element substrate 12 and the opposing substrate 13 are bonded to each other. To be specific, the element substrate 12 and the opposing substrate 13 are bonded to each other via the sealing material 14 having been applied to the element substrate 12. To be more specific, the bonding is carried out while keeping precision of the positioning in a planar longitudinal direction and a planar lateral direction between the substrates 12 and 13.

In step S43, liquid crystal is injected into the interior of the structure from the liquid crystal injection port 31 (see FIG. 2), thereafter the liquid crystal injection port 31 is sealed. The sealing member 32 formed of a resin or the like is used for sealing the port, for example. Through this, the manufacturing of the liquid crystal device 100 is finished.

Definitions

Figure 8:
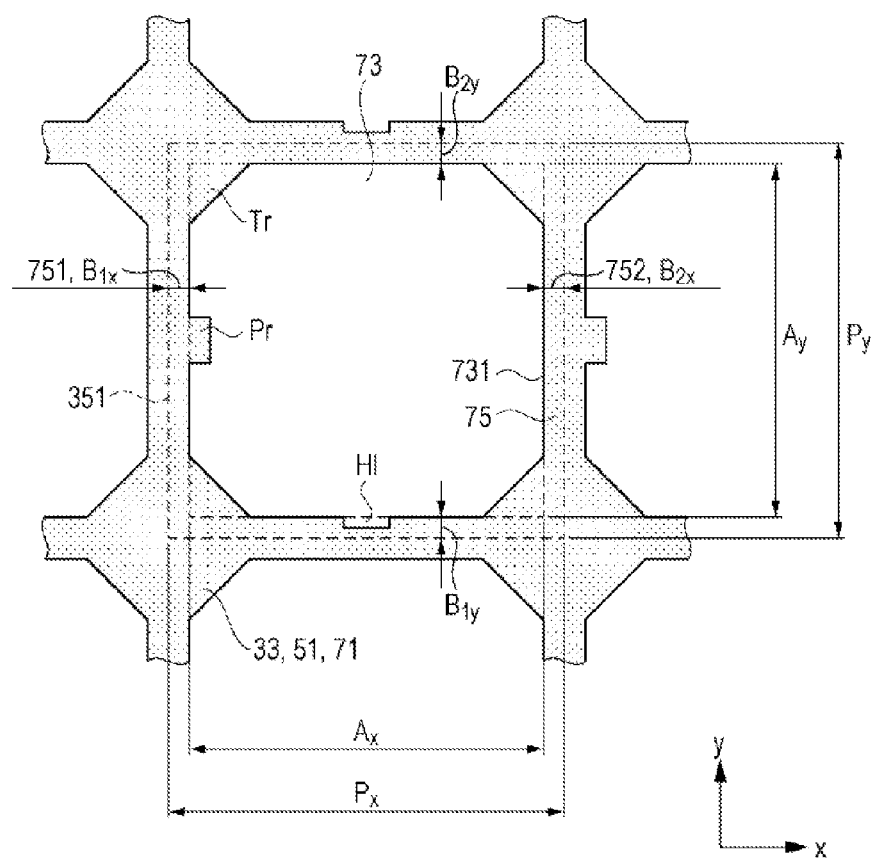
FIG. 8 is a schematic plan view illustrating a structure of a pixel.

FIG. 8 is a schematic plan view illustrating a structure of the pixel. Hereinafter, a relationship among the pixel division 351, the aperture 73, the light blocking portion 75, and so on in the pixel 35 will be described with reference to FIG. 8.

In Equations 5 through 10 having been described with reference to FIG. 6, used are the length $A_x$ of the aperture 73 and the length ($B_{1x}$ and $B_{2x}$) of the light blocking portion (the first light blocking portion 751 and second light blocking portion 752) which is the region other than the aperture 73 in the pixel division 351. Hereinafter, the definitions thereof will be given.

Within the pixel division 351 in a plan view, a part by which light is blocked and prevented from passing is the light blocking portion 75, and a part through which light passes is the aperture 73. The light blocking portion 75 is the part that is covered by any one of the lower-side light blocking film 51 and upper-side light blocking film 71 formed in the element substrate 12, and the light blocking film 33 formed in the opposing substrate 13, when viewed from top. Accordingly, the light blocking portion 75 includes a first main line extending along a first direction (the x axis in FIG. 8) and a second main line extending along a second direction (the y axis in FIG. 8) that intersects with the first direction. Further, the light blocking portion 75 includes intersections at which the first and second main lines intersect with each other. At the intersection, there may be provided a stick-out portion Tr that corner-cuts the aperture 73 slantwise against the first and second directions in some case. The stick-out portion Tr corner-cuts at least one of the corners of the substantial aperture 731, which will be explained later, forming a triangle shape. In addition, on the first main line or the second main line (hereinafter, if it is unnecessary to specifically distinguish the first and second lines from each other, they are each simply called the "main line"), there may be provided a projection Pr formed by the relay layer 62 or the like projecting from the main line to the aperture 73 and a recess Hl which is a recess formed by the main line being recessed to become thinner in some case. There is a case in which the projection Pr and the recess Hl are provided on the main lines, as shown in FIG. 8, and there is also a case in which the projection Pr and the recess Hl are provided at the intersections in place of the stick-out portions Tr. Note that projection Pr and recess Hl are determined taking the longest straight line as a reference within the inner edges (inside edges) of the light blocking portion extending along the main lines. As stated above, the shape of the light blocking portion 75 is complex in general (the shape of the aperture 73 is also complex in general); therefore, it will be discussed below how the length $A_x$ of the aperture 73 and the length of the light blocking portion (the length $B_{1x}$ of the first light blocking portion 751 and the length $B_{2x}$ of the second light blocking portion 752) appearing in Equations 5 through 10 should be defined in this case.

The length of the aperture 73 that appears in Equations 5 through 10 is the length of the substantial aperture 731 shown in FIG. 8; this length is $A_x$ along the x axis direction and $A_y$ along the y axis direction. The first light blocking portion 751 and second light blocking portion 752 that appear in Equations 5 through 10 are the portions each of which is an approximately half of the part that is not included in the substantial aperture 731 in the pixel division 351. The first light blocking portion 751 and the second light blocking portion 752 are respectively provided on the left and right sides or the upper and lower sides of the substantial aperture 731. For example, the first light blocking portion 751 is $B_{1x}$ along the x axis direction and $B_{1y}$ along the y axis direction. The second light blocking portion 752 is $B_{2x}$ along the x axis direction and $B_{2y}$ along the y axis direction. When a pitch along the x axis direction of the pixel 35 (length in the x axis direction of the pixel division 351) is taken as $P_x$, there exists a relationship of $P_x=A_x+B_{1x}+B_{2x}$. Likewise, when a pitch along the y axis direction of the pixel 35 (length in the y axis direction of the pixel division 351) is taken as $P_y$, there exists a relationship of $P_y=A_y+B_{1y}+B_{2y}$. In Equations 5 through 10, the description is given using $A_x$, $B_{1x}$ and $B_{2x}$ along the x axis direction; the same relationship also holds along the y axis direction, in which $A_x$, $B_{1x}$ and $B_{2x}$ are replaced with $A_y$, $B_{1y}$ and $B_{2y}$. Although it is preferable that Equations 8 and 10 at least be satisfied with respect to either the x axis direction or the y axis direction, it is more preferable that the equations be satisfied with respect to the x and y axis directions (both the directions). Although the width of the first main line and the width of the second main lime are the same in FIG. 8, these widths are not necessarily needed to be the same. In other words, even in the case of $B_{1x}+B_{2x} \ne B_{1y}+B_{2y}$, it is preferable that Equations 8 and 10 be satisfied with respect to any one of or both of the x and y axis directions. Moreover, although the pixel division 351 is square in shape in FIG. 8, it is acceptable that the pixel division 351 is rectangular in shape. In other words, even in the case of $P_x \ne P_y$, it is preferable that Equations 8 and 10 be satisfied with respect to any one of or both of the x and y axis directions.

The substantial aperture 731 is shaped along the main lines and is similar to the pixel division 351 in shape. The stick-out portion Tr and the projection Pr are each considered to be a part of the substantial aperture 731, whereas the recess Hl is not considered to be a part of the substantial aperture 731. A portion that is not included in the substantial aperture 731 in the pixel division 351 is the light blocking portion used in Equations 5 through 10. Accordingly, the stick-out portion Tr and the projection Pr are not included in the light blocking portion used in Equations 5 through 10; in contrast, the recess Hl is a part of the light blocking portion used in Equations 5 through 10. In other words, the stick-out portion Tr and the projection Pr are each defined as a region through which light can pass in Equation 5 through 10, and the recess Hl is defined as a region at which light is blocked in Equations 5 through 10.

Electronic Apparatus

Figure 9:
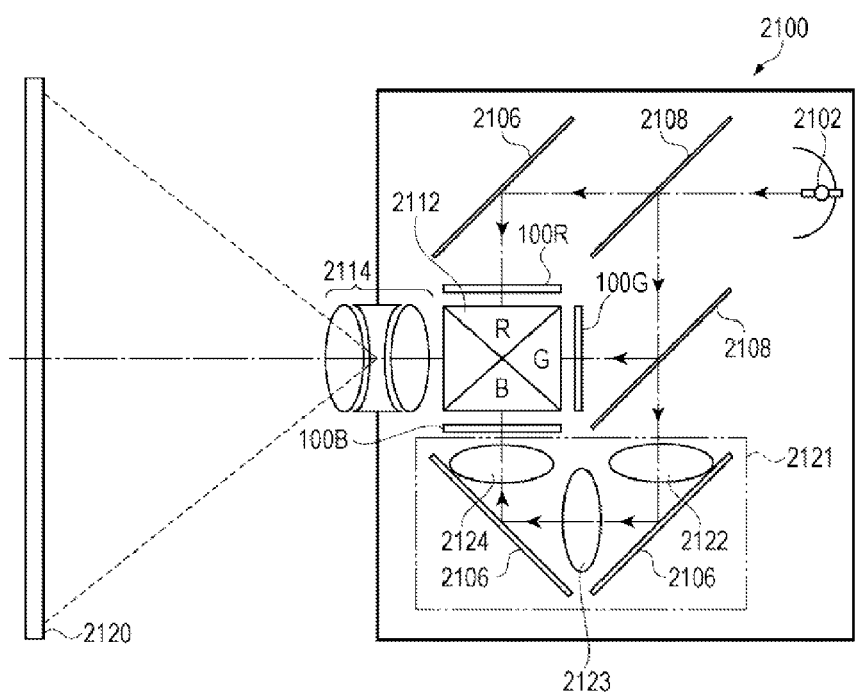
FIG. 9 is a plan view illustrating a structure of a projector.

FIG. 9 is a plan view illustrating a structure of a three-plate projector as an electronic apparatus. Next, the projector as an example of an electronic apparatus according to this embodiment will be described with reference to FIG. 9.

In a projector 2100, light emitted from a light source 2102 which is configured with a super-high pressure mercury lamp is separated into the three primary colors of light of red (R), green (G) and blue (B) by three mirrors 2106 and two dichroic mirrors 2108 disposed inside of the projector, and the separated primary colors of light are respectively guided to liquid crystal devices 100R, 100G and 100B which correspond to each of the primary colors. Light including the three primary colors is incident on the liquid crystal devices 100R, 100G and 100B from the side of the opposing substrate 13 in which the microlenses 23 are formed. As a result, the microlens 23 has a convex shape facing to the light incidence side, and the light blocking portion 75 is positioned on the light output side with respect to the microlens 23. Since blue light has a longer optical path than red light and green light, blue light is guided via a relay lens system 2121 configured of an incidence lens 2122, a relay lens 2123 and an output lens 2124 so as to prevent optical loss of the blue light.

The liquid crystal devices 100R, 100G and 100B have the above-described configuration and are respectively driven by an image signal corresponding to each of the red, green and blue colors supplied from an external device (not shown).

Beams of light having been respectively modulated by the liquid crystal devices 100R, 100G and 100B enter a dichroic prism 2112 from three directions. In this dichroic prism 2112, the red light and blue light are refracted by 90 degrees, while the green light travels in a straight line. Light that expresses a color image combined in the dichroic prism 2112 is enlarged and projected by a lens unit 2114, whereby a full-color image is displayed on a screen 2120.

While transmission images of the liquid crystal devices 100R and 100B are projected after having been reflected by the dichroic prism 2112, a transmission image of the liquid crystal device 100G is projected as-is. Accordingly, the images formed by the liquid crystal devices 100R, 100B and the image formed by the liquid crystal device 100G are set to be horizontally reversed to each other.

Since the projector 2100 according to this embodiment uses the above-described liquid crystal devices 100R, 100G and 100B, it is possible to project a bright high-quality full-color image with high precision.

As electronic apparatuses, in addition to the projector having been described with reference to FIG. 9, a rear-projection television, a direct-view television, a cellular phone, a mobile audio device, a personal computer, a video camera monitor, a car navigation device, a pager, an electronic notebook, an electronic calculator, a word processor, a workstation, a TV phone, a POS terminal, a digital still camera, and so on can be cited. It is also possible to apply the liquid crystal device 100, the microlens array substrate, and the like that are described in detail in this embodiment to the above-cited electronic apparatuses.

As described above in detail, according to this embodiment, the following effect can be obtained.

It is possible to make a microlens be an aspheric lens that has a linear side surface, and it is also possible to output parallel light that has been perpendicularly incident on the microlens to an aperture. That is, incident light on the microlens can be efficiently guided to the aperture. In other words, it is possible to optimize the shape of a beam of light outputted from the microlens and to enhance the efficiency in use of the light.

The invention is not limited to the above-described embodiment, and various kinds of modifications and improvements can be added on the above embodiment. A variation on the embodiment will be described below.

Variation 1

Figure 10:
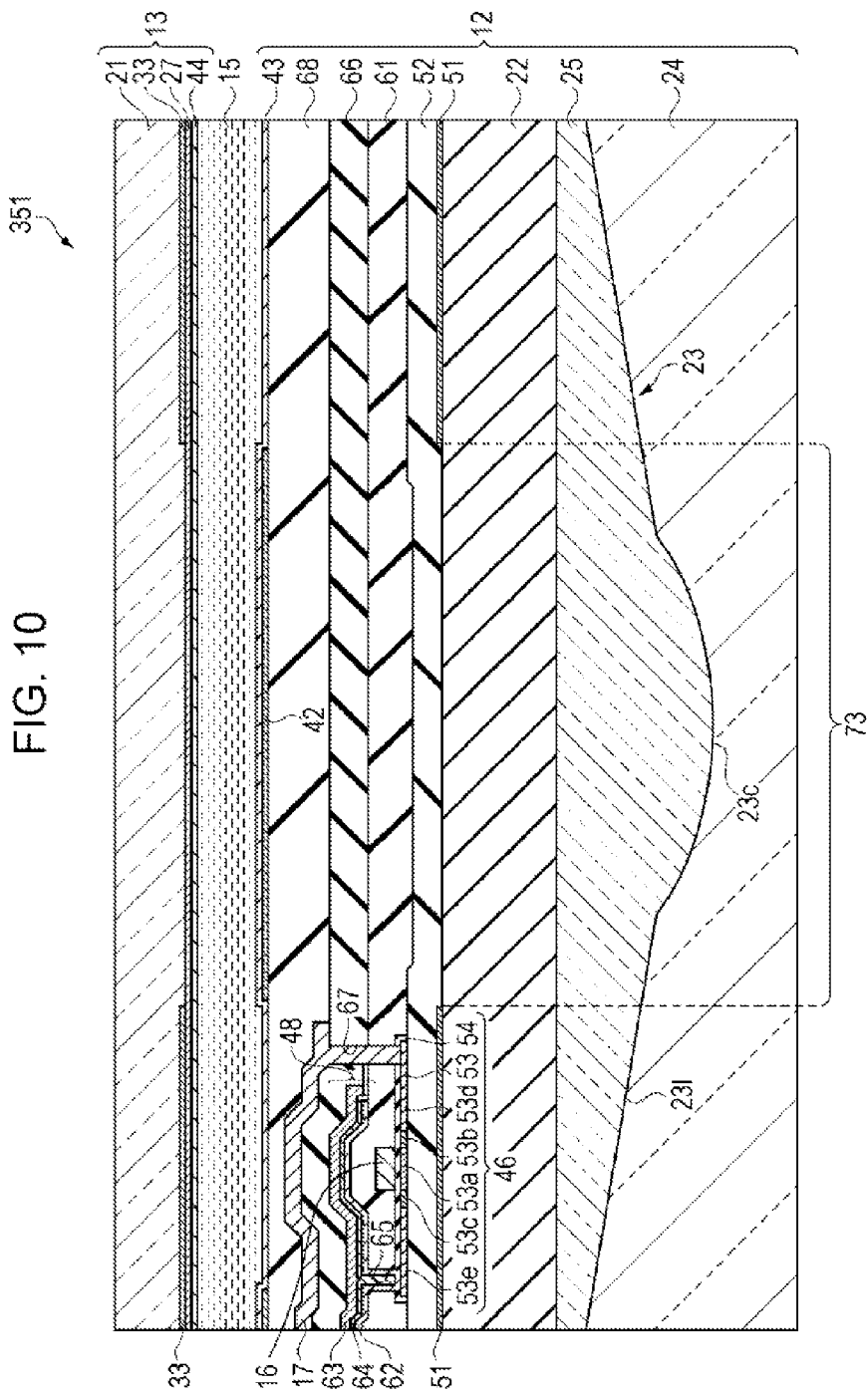
FIG. 10 is a schematic cross-sectional view illustrating a structure of a liquid crystal device according to a variation 1.

FIG. 10 is a schematic cross-sectional view illustrating a structure of a liquid crystal device according to a variation 1, in which a cross-section of one pixel division is drawn. Next, a microlens array substrate and an electro-optic device according to this variation will be described with reference to FIG. 10. Note that a cross-sectional relationship of the positions between the constituent elements is depicted in FIG. 10, and FIG. 10 is drawn with a scale in which those constituent elements can be explicitly illustrated. Further, in FIG. 10, for the sake of description, a cross-section for explaining the structure of a TFT and a cross-section that traverses the center of a microlens are illustrated. The same constituent elements as those in the first embodiment will be given the same reference numerals and duplicate description thereof will be omitted.

In this variation, when compared to the first embodiment, the first substrate and the second substrate are interchanged with each other; other constituent elements of the configuration are approximately the same as those in the first embodiment. In the first embodiment, as shown in FIG. 5, the element substrate 12 is the first substrate and the opposing substrate 13 is the second substrate. In other words, the microlens 23 is formed in the opposing substrate 13, and the opposing substrate 13 is also the microlens array substrate. On the other hand, in this variation as shown in FIG. 10, the element substrate 12 is the second substrate, while the opposing substrate 13 is the first substrate. In other words, the microlens 23 is formed in the element substrate 12, that is, the element substrate 12 is also the microlens array substrate.

As shown in FIG. 10, the liquid crystal device 100 includes the second transparent substrate 24 and the first transparent substrate 21 that is disposed being opposed to the second transparent substrate 24. The first transparent substrate 21 and second transparent substrate 24 are formed of, for example, a quartz substrate, a glass substrate, or the like.

The microlens 23 is formed in the second transparent substrate 24, and the adjustment film 22 covers the microlens 23. The structures of the microlens 23 and the adjustment film 22 are the same as those in the first embodiment. On the adjustment film 22, the lower-side light blocking film 51 made of titanium (Ti), chromium (Cr), or the like is formed. Note that the structure from this lower-side light blocking film 51 up to the liquid crystal layer 15 is also the same as that of the first embodiment.

The light blocking film 33, the common electrode 27, and the second alignment layer 44 are formed in the first transparent substrate 21, and these constituent elements are included in the opposing substrate 13.

Light enters the liquid crystal device 100 from the element substrate 12 side. In the case where the microlens 23 is formed in the element substrate 12, as in this variation, it is preferable for the medium 25 to be an inorganic material such as a high refractive-index silicon oxynitride film (SiON) rather than a resin. This is because the TFT elements 46 can be manufactured in a regular manufacturing process.

This application claims priority from Japanese Patent Application No. 2012-114155 filed in the Japanese Patent Office on May 18, 2012, the entire disclosure of which is hereby incorporated by reference in its entirely.

What is claimed is:

1. A microlens array substrate comprising:
    a transparent substrate having a recess on one surface;
    a microlens that has a larger refractive index than the transparent substrate and that is in the recess;
    a light blocking portion that defines an aperture corresponding to the microlens in plan view; and
    an adjustment film formed on the microlens,
    wherein
        the microlens includes a lens center portion that is formed at a center of the microlens in plan view and that has a curved surface, and a lens circumference portion that is formed continuously with the curved surface and formed circularly surrounding the lens center portion in plan view, and that has a linear side surface in a cross-section that traverses the center of the lens, and
        a relational expression of Equation 1 described below is satisfied, in which a length of the linear side surface is taken as $L_1$, a length of the aperture is taken as $A_x$, an angle formed by a normal of the linear side surface and incident light on the microlens is taken as $\theta_1$, and an angle formed by the normal of the linear side surface and output light from the microlens is taken as $\theta_2$:

$$0 < L_1 \le \frac{A_x \cos(\theta_1 - \theta_2)}{\cos\theta_2} \qquad \text{Equation 1}$$

wherein
    the light blocking portion includes a first light blocking portion having a length of $B_{1x}$ and a second light blocking portion having a length of $B_{2x}$, and a relational expression of Equation 2 described below is satisfied, in which a length from the microlens to the light blocking portion is taken as $L_z$:

$$B_{1x}\tan\left\{\frac{\pi}{2} - (\theta_1 - \theta_2)\right\} \leq L_z \leq (A_x + B_{1x})\tan\left\{\frac{\pi}{2} - (\theta_1 - \theta_2)\right\}, \quad \text{Equation 2}$$

and
wherein
the light blocking portion is formed on the adjustment film, and
a thickness of the adjustment film is set approximately equal to the length $L_z$ from the microlens to the light blocking portion.

2. An electronic apparatus comprising:
the microlens array substrate according to claim 1, wherein the microlens is formed in a convex shape facing to the light incidence side, and the light blocking portion is positioned on the light output side with respect to the microlens.

3. The microlens array substrate according to claim 1, wherein the adjustment film includes a silicon oxide film.

4. The microlens array substrate according to claim 1, wherein the relational expression of Equation 1 and the relational expression of Equation 2 are satisfied in both an x axis direction corresponding to an extension direction of a first side edge of the aperture and a y axis direction corresponding to an extension direction of a second side edge of the aperture intersecting the first side edge.

5. The microlens array substrate according to claim 4, wherein the first side edge of the aperture is shorter than the second side edge of the aperture.

6. An electro-optic device comprising:
a transparent substrate having a lens-shaped recess on one surface;
a microlens that is filled with a lens material having a larger refractive index than the transparent substrate and that is embedded in the recess;
a light blocking portion that defines an aperture at an area at least corresponding to the center of the microlens when viewed from top; and
an adjustment film formed on the microlens, wherein
the microlens includes a lens center portion that is formed at the center of the microlens when viewed from top and has a lens-curved surface, and a lens circumference portion that is formed continuously with the lens-curved surface and formed circularly surrounding the lens center portion when viewed from top, and that has a linear side surface in a cross-section that traverses the center of the lens, and
a relational expression of Equation 3 described below is satisfied, in which a length of the linear side surface is taken as $L_1$, a length of the aperture is taken as $A_x$, an angle formed by a normal of the linear side surface and incident light on the microlens is taken as $\theta_1$, and an angle formed by the normal of the linear side surface and output light from the microlens is taken as $\theta_2$:

$$0 < L_1 \leq \frac{A_x \cos(\theta_1 - \theta_2)}{\cos\theta_2}, \quad \text{Equation 3}$$

wherein
the light blocking portion includes a first light blocking portion having a length of $B_{1x}$ and a second light blocking portion having a length of $B_{2x}$, and
a relational expression of Equation 4 described below is satisfied, in which a length from the microlens to the light blocking portion is taken as $L_z$:

$$B_{1x}\tan\left\{\frac{\pi}{2} - (\theta_1 - \theta_2)\right\} \leq L_z \leq (A_x + B_{1x})\tan\left\{\frac{\pi}{2} - (\theta_1 - \theta_2)\right\}, \quad \text{Equation 4}$$

and
wherein
the light blocking portion is formed on the adjustment film, and
the adjustment film sets the length $L_z$ from the microlens to the light blocking portion.

7. The electro-optic device according to claim 6, comprising:
a first substrate;
a second substrate, and
a liquid crystal layer disposed between the first substrate and the second substrate,
wherein the light blocking portion is formed in the first substrate, and the microlens is formed in the second substrate.

* * * * *